Feb. 5, 1952  G. M. MAST ET AL  2,584,481
INFANT'S CONVERTIBLE SEAT AND BED
Filed Nov. 2, 1948  5 Sheets-Sheet 1

INVENTORS.
G. M. MAST, W. K. GANNETT,
L. M. SHUH
BY Merrill M. Blackburn
ATTORNEY Feb. 5, 1952 G. M. MAST ET AL 2,584,481
INFANT'S CONVERTIBLE SEAT AND BED
Filed Nov. 2, 1948 5 Sheets-Sheet 2

INVENTORS.
G. M. MAST, W. K. GANNETT,
L. M. SHUH
BY
Merrill M. Blackburn
ATTORNEY Feb. 5, 1952 G. M. MAST ET AL 2,584,481
INFANT'S CONVERTIBLE SEAT AND BED
Filed Nov. 2, 1948 5 Sheets-Sheet 3
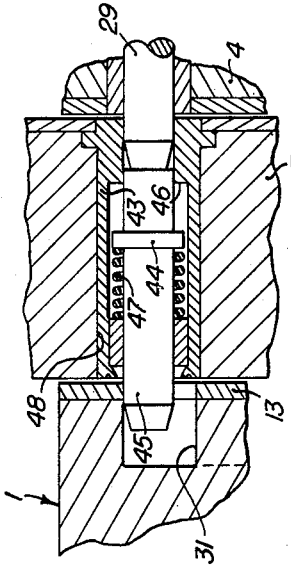
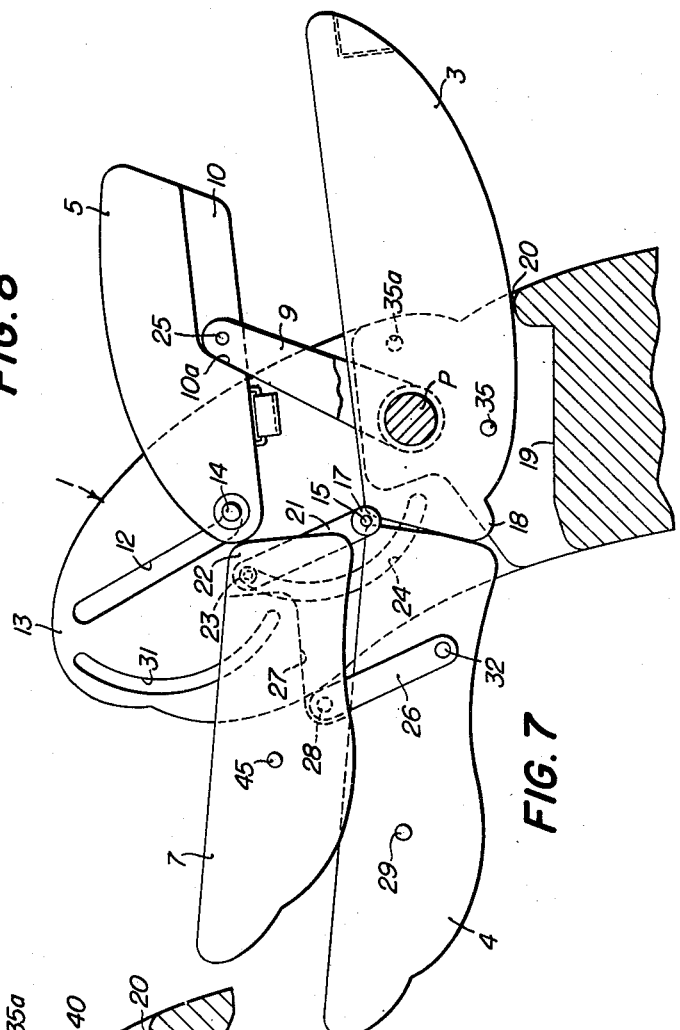
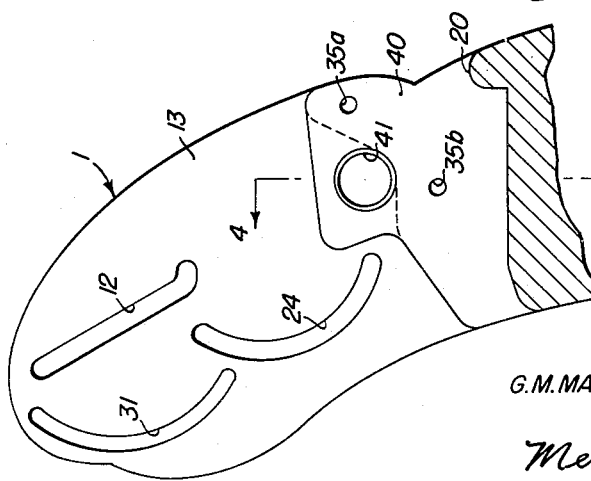
INVENTORS.
G.M.MAST, W.K.GANNETT, L.M.SHUH
BY
Merrill M. Blackburn
ATTORNEY Feb. 5, 1952 G. M. MAST ET AL 2,584,481
INFANT'S CONVERTIBLE SEAT AND BED
Filed Nov. 2, 1948 5 Sheets-Sheet 4
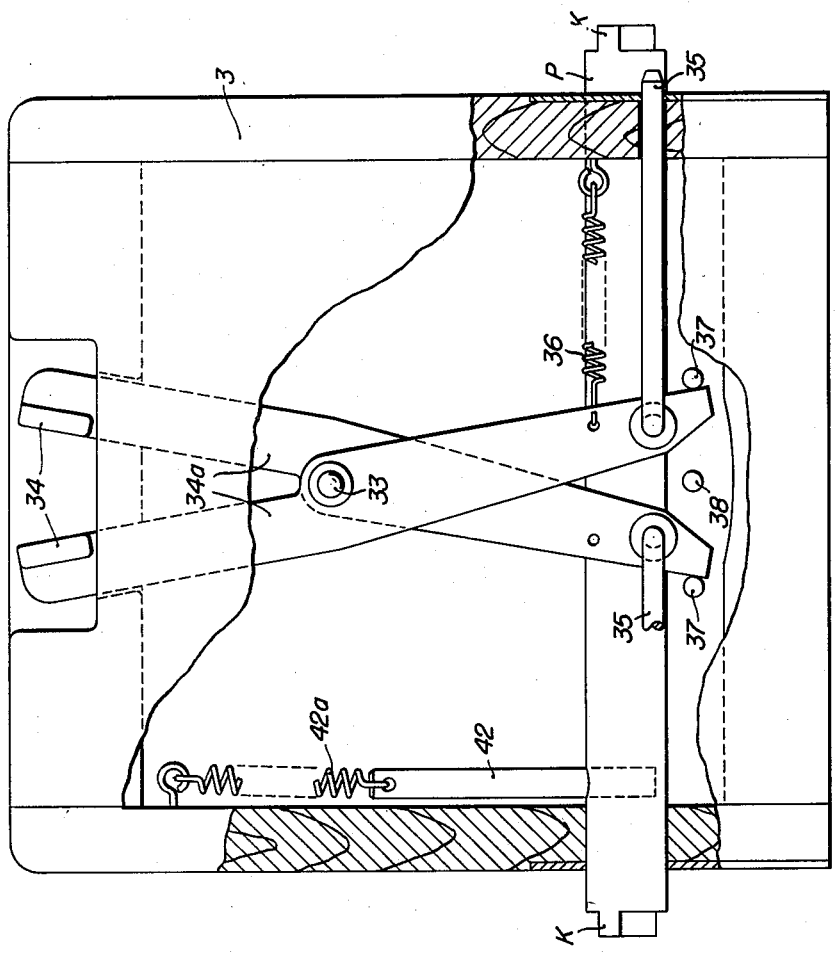
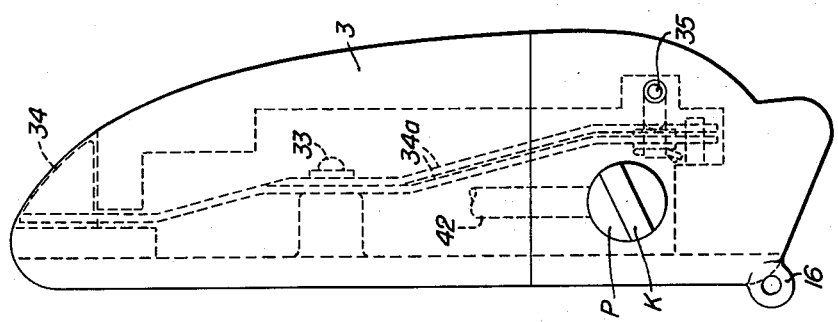
INVENTORS.
G.M. MAST, W.K. GANNETT, L.M. SHUH
BY
Merrill M. Blackburn
ATTORNEY Feb. 5, 1952 G. M. MAST ET AL 2,584,481
INFANT'S CONVERTIBLE SEAT AND BED
Filed Nov. 2, 1948 5 Sheets-Sheet 5
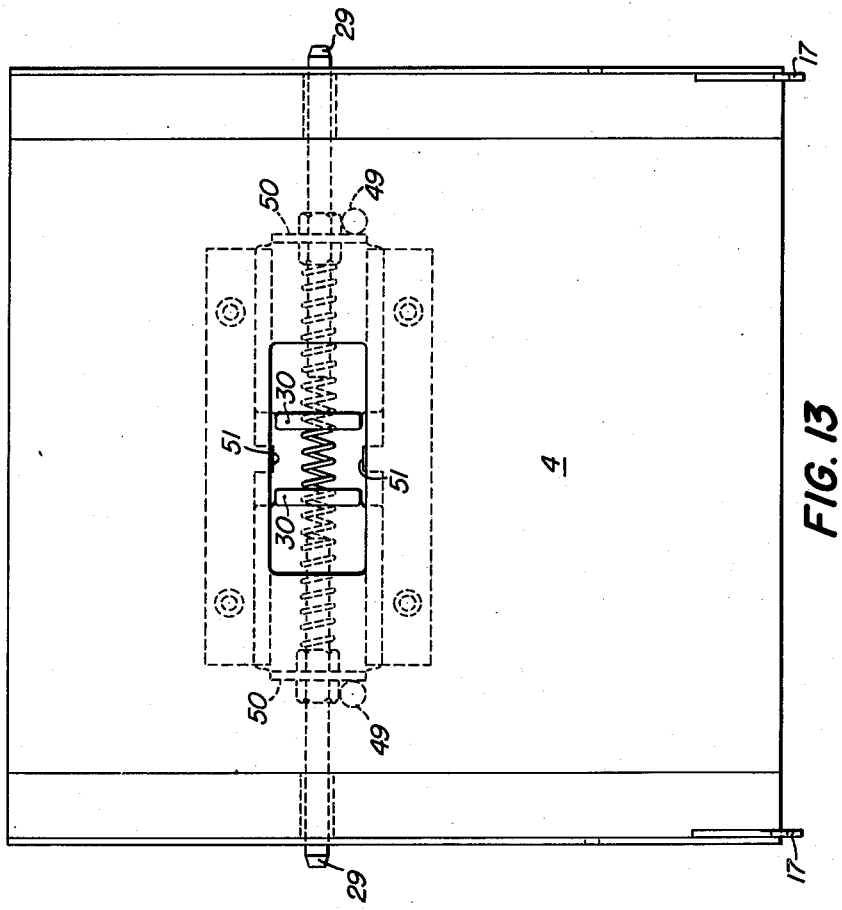
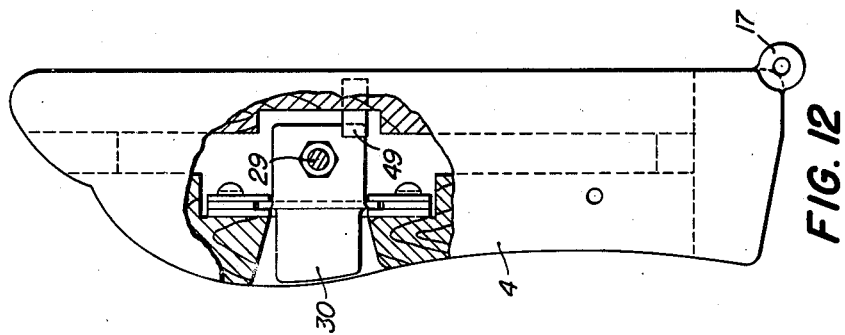
INVENTORS.
G.M. MAST, W.K. GANNETT, L.M. SHUH
BY
*Merrill M. Blackburn*
ATTORNEY Patented Feb. 5, 1952

2,584,481

UNITED STATES PATENT OFFICE 2,584,481

INFANT'S CONVERTIBLE SEAT AND BED

Gifford M. Mast, Wright K. Gannett, and Lewis M. Shuh, Davenport, Iowa, assignors to Byrdie Glatstein, Muscatine, Iowa Application November 2, 1948, Serial No. 57,914

19 Claims. (Cl. 155—45)

Our present invention is in the nature of improvements upon the structure shown in the Byrdie Glatstein Patent No. 2,436,294, issued February 17, 1948. Among the objects of this invention are the provision of means for latching the parts of the infant's seat or bed in open or closed position; the provision of means for insuring that the parts of the seat or bed will function simultaneously; the provision of a construction which, when folded up, in a closed position, will match the rest of the seat and be as inconspicuous as possible; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Fig. 7 represents a similar transverse vertical section through the structure shown in Fig. 3, arranged as an infant's bed;

Fig. 8 represents a fragmentary section taken approximately along the plane indicated by the line 8—8, Fig. 6;

Fig. 9 represents a transverse vertical section of the seat, fragmentarily, with the movable parts of the infant's seat removed.

Fig. 10 represents a front elevation of this seat, partly broken away, to show the pivot means and the latching means;

Fig. 11 represents a side view of the structure shown in Fig. 10;

Fig. 12 represents a side view of the back element mating with the structure shown in Fig. 11, the same being shown partly broken away for the sake of clarity of disclosure;

Fig. 13 represents a rear face view of the structure shown in Fig. 12; and

Figure 2:
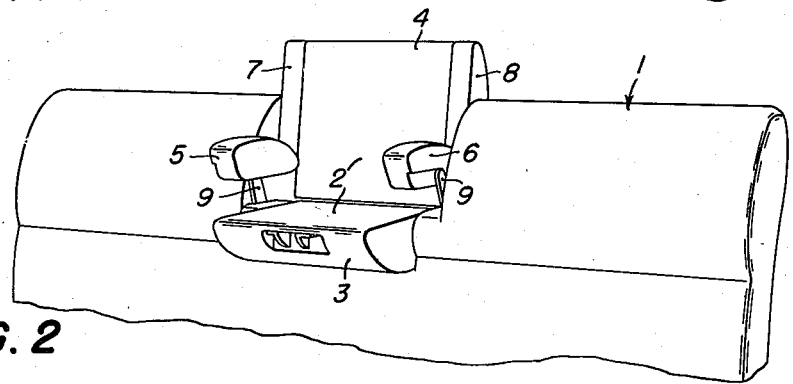
Fig. 2 is a view similar to Fig. 1 with our improvements opened up into the position of an infant's seat.
Figure 3:
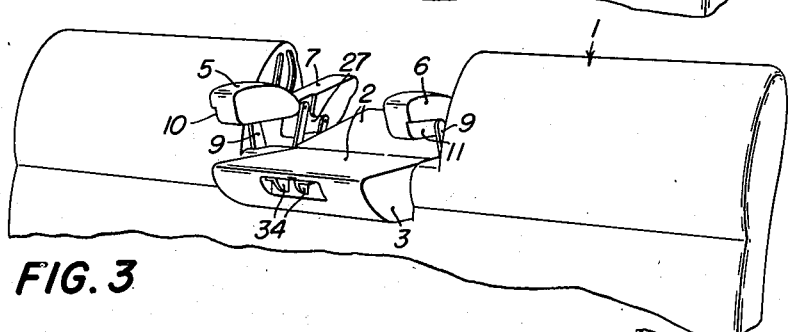
Fig. 3 is a similar view with the parts in position for an infant's bed.

Reference will now be made in greater detail to the annexed drawings for a more complete description of this invention. This improvement is adaptable for various uses and, in the annexed drawings, the part 1 represents the seat of a vehicle such as an automobile, airplane, street car, railroad car, etc., and this is to be regarded as a merely typical showing of a seat for adults, while the portion 2 of the seat, comprising the parts 3 and 4, is made up of a number of relatively foldable parts which may be unfolded, as shown in Fig. 2, to provide a seat for an infant or, as shown in Fig. 3, to provide a bed for an infant, the same being referred to herein as an auxiliary portion. The forward portion of this auxiliary seat is shown at 3 and the rearward portion thereof at 4. There are automatically foldable parts 5 and 6 which serve as arm rests for the auxiliary seat when opened up, as shown in Fig. 2, and as side pieces for the bed, when opened up as shown in Fig. 3. There are other side pieces 7 and 8 which can be opened up when the back piece 4 is positioned as in Fig. 3, in which position the parts 7 and 8 serve as side rails for the bed.

Figure 1:
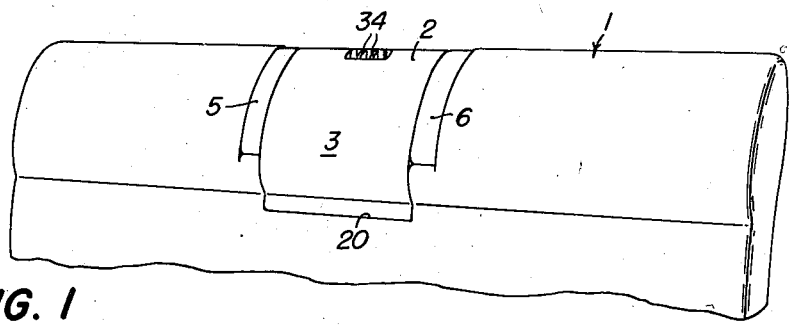
Fig. 1 is a fragmentary view of a seat back with our improvements added thereto, and in closed position.
Figure 5:
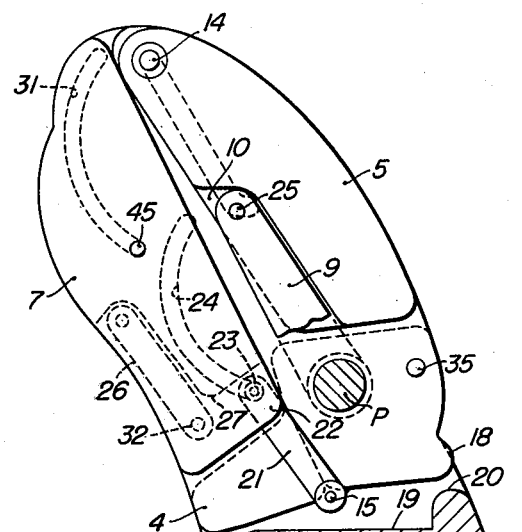
Fig. 5 represents a transverse vertical section taken at one end of the infant's added seat, as shown in Fig. 1.
Figure 6:
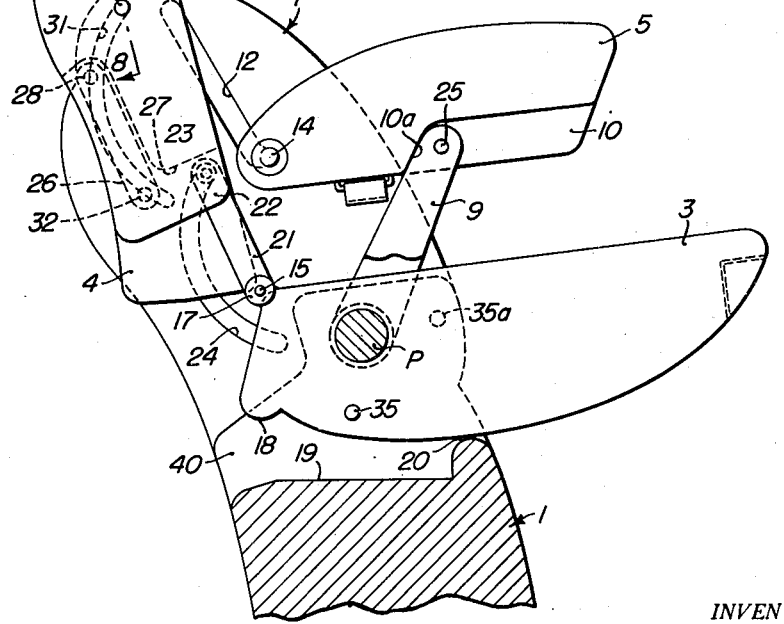
Fig. 6 represents a similar transverse vertical section through the structure shown in Fig. 2, arranged as an infant's seat.

In order that the seat 3 may be pulled from the position shown in Fig. 1 to that shown in Fig. 2, a pivot P connects the seat part 3 to the back of the seat 1, as may be seen especially in Figs. 5, 6, and 7. Pivotally connecting the arm rest 5 to the seat pivot P is an arm 9 which may be received in the recess 10 of the arm rest 5 when the parts are folded into the position shown in Fig. 5. A comparable recess 11, as shown in Fig. 3, is provided in arm rest 6 which permits relative pivotal motion between the arm 9 and the arm rest 6.

Suitable slots or grooves 12 are formed in each of the facing plates 13 of the two facing ends of the seat 1 and serve to receive and guide the pins 14 mounted in the arm rests 5 and 6. These pins 14 and slots 12 are for the purpose of guiding the rear ends of the arms as the seat is folded or unfolded. Naturally, as the arm rests 5 and 6 move rearwardly and upwardly, the rear ends of the arm rests 5 and 6 follow the same direction that the pins 14 travel in the slots 12 until they are located in the upper rear portions of said slots, and the arm rests 5 and 6 are in the positions shown in Fig. 1.

Pivot pins 15 extend through eyes 16, 17 secured to the lower corners of the seat 3 and back 4 and connect these parts for simultaneous motion. As the seat 3 turns upwardly about the axis of pivot member P, the lower corner 18 thereof swings in an arc and just clears the bottom 19 of the notch in which the auxiliary seat parts are mounted for rotation. It also clears the rib 20 so that the parts may appear as in Fig. 1 when folded up. When this motion is taking place, the pivot pin 15 is moving downwardly in an arc about the axis of pivot member P and, since the pivot pin 15 passes through the end of link 21, that is carried downward with the rear end of the seat member 3, as indicated in Fig. 5. The second ends of links 21 are connected to the lower corners 22 of the side rails 7 and 8 by pins 23, and the motions of the side rails 7 and 8 are therefore controlled, in part, by the link 21 and the seat 3.

Now, following, on Figs. 5, 6, and 7, the action of these parts, we see that, as the part 3 turns about the pivot P, the pivot 15 and link 21 move upwardly, causing the pivot 23 to move upwardly in the slot 24, from the lower end thereof to the upper end. By comparison of Figs. 5 and 6, it will be seen that this pivotal motion of the seat 3 causes the back 4 to be raised, and the side rails 7 and 8 to be raised simultaneously. At the same time, the rests 5 and 6 will move upwardly toward the position shown in Fig. 6, because the pin 14, riding in the slot 12, keeps the upper ends of the rests 5 and 6 from turning out with the seat, as shown in Fig. 5, the pins 14, mounted in the ends of the rests 5 and 6, sliding downwardly in the slots 12 until they reach the lower end thereof. These rests 5 and 6 are supported by the links 9, pivoted at one end to the pivot P and at their other ends to the pivots 25. The construction on the two sides of the seat is identical.

If it is desired to convert the seat of Fig. 6 into the bed shown in Fig. 7, the latch pin 29 is released from the groove 31 and the back 4 is turned about the pivots 15. The back 4 is connected by a link 26 to the inside of the side rails 7 and 8 by pivots 28, the rails being hollowed out, as shown at 27. Since the links 21 and 26 are pivotally connected to the back 4 by pivots 15 and 32 and the side rails 7 and 8 are connected to the links by pivots 23 and 28, the rails are held above the back, as shown in Fig. 7, when the back is lowered, being held up because the links 21 hold the pivots 23 a fixed distance from the pivots 15. Therefore, the back 4 moves away from the side rails 7 and 8, as shown in Fig. 7. In order to permit the back 4 to move backwardly and downwardly, as shown in Fig. 7, it is necessary to withdraw the pins 29 from the latching position shown in Fig. 8. This is done by pressing the handles 30 together, as shown in Fig. 13, which tends to draw the latching pins 29 away from the latching pins 45, and these are caused by springs 47 to follow the pins 29 and withdraw from the grooves 31, thus permitting movement of the back 4 relatively to the arms 7 and 8. When the pins 45 are withdrawn from the grooves 31, the shoulders 44 on these pins abut against the shoulders 46 of the sleeves 43. This stops the pins 45 so that they do not project beyond either side of the side rails 7 and 8. As the pivot members 32 move downwardly with the back 4, the links 26 also move downwardly and carry with them the pivots 28 secured to the side rails 7 and 8. This causes the side rails to turn about the pivotal connections 23 with links 21. Since the pivots 32 are mounted in the edge of the back 4, they are stationary with reference thereto and links 26 cause positioning of the side rails 7 and 8. The pivotal connections 28 are fixed with relation to the side rails 7 and 8, and the connections 32 with relation to the back 4. Therefore, when the back 4 and the side rails 7 and 8 are raised, as shown in Fig. 6, these parts are in alignment, as shown in that figure, and, when lowered, they occupy the positions shown in Fig. 7. When the parts are as represented in Fig. 6 and the seat 3 is turned upwardly to the position shown in Fig. 5, the latching pins 45 follow the grooves 31 to the bottom thereof, as indicated in Fig. 5, the back 4 and the side rails 7 and 8 being lowered, as indicated in Fig. 7.

Figure 14:
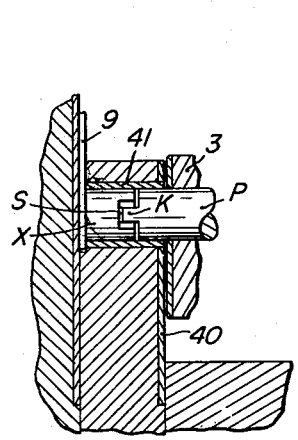
Fig. 14 is a fragmentary view of the main pivot member and its connection to the lever arm which raises the arm rest when the seat is opened up.

The main pivot member P has a flat key member K at each end, as shown in Fig. 14, and this key fits, with a certain degree of looseness, in a slot S in an extension X of pivot P, connected by an arm 42 and spring 42a to the frame of the seat 3, as shown in Fig. 10. Therefore, as the seat member 3 moves from its upright position, as shown in Fig. 5, toward its unfolded position, as shown in Fig. 6, there is a tendency to put the spring 42a under tension and to turn the pivot P toward the right, as viewed in Figs. 5 and 6. However, anything which resists the turning of pivot member P causes lengthening of the spring 42a. Since the pivot P is connected, through extension X, to the arm 9, as shown in Fig. 10, there is caused a forward swinging of the arms 9, but these arms do not swing as far as the seat 3 and the connection 42, 42a. This is because of the excess in size of the slot S over key K and the consequent free play between the seat 3 and the arms 9. As the seat 3 goes down, the pivot 14 slides down in the slot 12 and the arms 9 swing the lower ends of the arm rests 5 and 6 outwardly to positions as shown in Fig. 6. As a matter of fact, the spring 42a tends to hold the arms 9 in line with the seat 3, that is, between the seat and the adjacent arm rests. In other words, the tendency is to pull the arm rests down to the level of the seat, when unfolded, as shown in Fig. 7. However, when the parts reach the positions shown in Fig. 7, the shoulder 10a bears against the arm 9 and prevents the arm rests 5 and 6 from going lower and getting into an inclined position, while the lower ends of the slots 12 prevent the arm rests from turning about the pivots 25. When the structure reaches the unfolded position, as shown in Fig. 6, the pivots P, 14, and 25 form a triangle having sides of fixed lengths and angles of constant size, and these triangles hold the arm rests up in their limit positions, as shown in Fig. 6.

Figure 4:
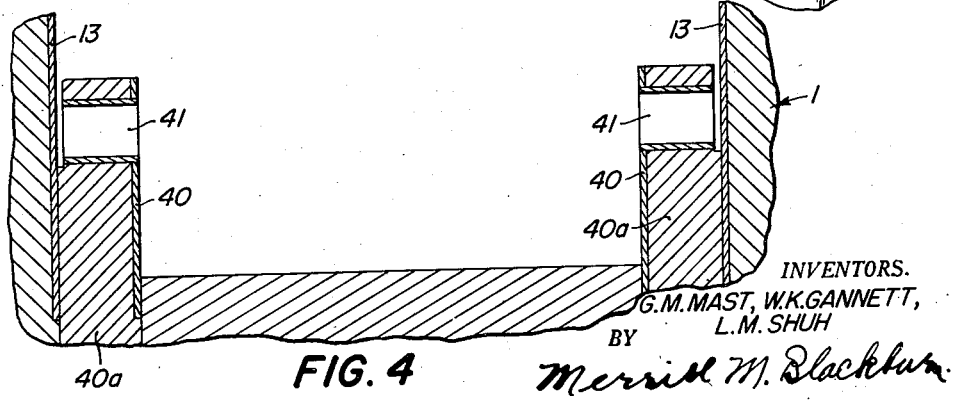
Fig. 4 represents a longitudinal section substantially along the vertical plane indicated by the line 4—4, Fig. 9.

A pair of levers 34a are mounted within the seat 3 on pivot 33 and may be turned relatively to each other by pressing the handles 34 together, thus drawing the latching pins 35 out of latching position, as indicated at 35a, and into a position within the seat 3 sufficiently to prevent them from engaging the seat back 1, and thus preventing the seat 3 from turning around the pivot P. The levers 34a, by reason of springs 36, tend to force the latching pins 35 into holes 35a. These springs 36, shown in Fig. 10, draw the lower ends of the levers 34a outwardly against the pins 37 mounted in the lower part of the seat 3. Another pin 38 insures the centering of the levers 34a and release of the latching means 35 from the opening 35a in the plates 40, as shown in Fig. 9, lining the lower part of the notch in the back of the seat 1. The holes 35a receive the ends of the latching pins 35 to hold the seat 3 up in the position shown in Fig. 1, while the holes 35b, as shown in Fig. 9, receive the ends of the pins 35 to hold the seat 3 in unfolded position, as shown in Figs. 2, 3, 6, and 7. The part 40a, as shown in Fig. 4, is a block of a thickness corresponding to the thickness of the arm rests 5 and 6 so that the space will be filled and there will be less likelihood of parts working loose. These blocks also serve to hold the metal liners in place and position the arms 9. Sleeves 41 are provided for the reception of the ends of the pivot member P which turns in these sleeves.

When the back 4 and side rails 7 and 8 are folded up, as shown in Figs. 5 and 6, and it is desired to unfold them to the position shown in Fig. 7, it is necessary to release the latching means 29, as shown in Fig. 8. This is done by pressing the finger pieces 30 toward each other and this, as stated above, makes the tapered end of the latching means 29 clear the end of the sleeve 43, permitting the back 4 to turn down, as shown in Fig. 7. At the same time that the latching means 29 clears the sleeve 43, the ring or shoulder 44 on the latching pin 45 abuts against the shoulder 46 of sleeve 43 and is stopped in its motion under the influence of the spring 47. Since this pin 45 is the same length as the sleeve 43, its ends do not project outwardly into engagement with either the vehicle seat 1 or the back 4, and relative motion of these parts is therefore not prevented. The pivots 15, 23, 28, and 32, during this movement, maintain a parallelogram arrangement in conjunction with the links 21 and 26, as will be seen by a comparison of Figs. 5, 6, and 7. As is clear from Fig. 8, the latching pin 29 passes out from the back 4 and into the sleeve 43. The side rails 7 and 8 have holes 48 passing entirely therethrough and housing the sleeve 43. It is clear that the pins 29 must be released from the side rails 7 and 8 to permit relative turning from the position shown in Figs. 5 or 6 to that shown in Fig. 7. As shown in Fig. 13, stop members 50 are secured to the latching pins 29, and these engage stop members 49 to limit the outward motion of the pins 29. Stop members 51 limit the amount of travel of the handles 30, when withdrawing the latching pins 29.

It is of course understood that the specific description of structure set forth above may be departed from without departing from the spirit of this invention as disclosed in the foregoing specification and as defined by the appended claims.

Having now described our invention, we claim:

1. An attachment for an adult vehicle seat comprising, in one position, a part of the adult seat back and, in another position, a chair for an infant, said chair comprising a seat portion, a back portion, and arm rests which, when folded, occupy positions at the sides of the seat portion to complete the back portion of the adult seat, the seat portion having a main supporting shaft, about the axis of which the infant's seat turns, and arms pivotally mounted on said shaft, at one end, and having the arm rests centrally connected, pivotally, at the second end of said arms, said arm rests being slidably and pivotally connected at one end to the adult seat back whereby the structure may be folded up with the arm rests beside the infant's seat, the rests and seat forming a part of the complete adult seat back.

2. A vehicle seat comprising a main seat having a portion of the back omitted to form an opening for the reception of the parts of an infant's seat, the infant's seat comprising a seat part and a back part, and a main supporting shaft pivotally connected to the adult seat back, the seat part of the infant's seat being pivotally mounted on said shaft, the back part of the infant's seat having pivotal connection with the seat part thereof so that both parts may be completely unfolded to form a bed, the seat part may be unfolded without disturbing the back part of the infant's seat, with the seat part unfolded to form a seat, or with all parts undisturbed whereby to leave the back of the adult seat complete.

3. A vehicle seat having a notch extending entirely therethrough intermediate the ends thereof from the top down to a point intermediate the height of the seat back, a main shaft extending across the notch with its ends pivotally mounted in the end walls of the notch, a combined seat member and back member pivotally mounted on said shaft and capable of swinging motion between positions in which it serves as a seat for an infant, a part of an infant's bed, or a part of a vehicle seat for an adult, and arm rests supported on said shaft.

4. A structure as defined by claim 3 having a seat back for an infant's seat, pivotally connected at its lower end to the lower end of the combined seat member and back element, said seat back being turnable about its pivotal connection to the combined seat member and back element from an approximately vertical position to an approximately horizontal position, and vice versa.

5. In a vehicle seat having a seat element and a back element provided with a notch extending part way down from the top to the seat, a main pivot shaft extending between the sides of the notch, arms on said shaft, and arm rests pivoted at their mid-portions at one end of said arms, each arm rest having a recess for the reception of one of the arms, the seat element having guiding slots in the opposed faces of the notch which serve to guide the movements of the arm rests, the arms serving as supports for the arm rests.

6. In a vehicle seat having a main seat section and an infant's seat and bed pivotally connected thereto, the infant's structure comprising a seat section, a back section, arm rests, and sides rails, a main pivot member pivotally mounted in the main seat section and supporting, for pivotal motion, the seat section of the infant's structure, the back section of the infant's seat being pivotally connected to the seat section thereof for vertical swinging motion, side rails at the sides of the back section when in raised position, and out of line therewith and at a higher elevation when the back is in lowered position, and parallel links connecting the infant's back section, the side rails and the infant's seat section moving correspondingly to each other whereby to insure that in one position the parts will produce an infant's bed and in another position they will form parts of a complete adult seat.

7. A structure as defined by claim 6 having latching pins to latch the parts in folded position, and latch pin operating means to cause unlatching thereof.

8. A structure as defined by claim 6 having a latching pin for holding the seat portion of the infant's seat in either upright or unfolded position, and operating means for operation of the latching pins.

9. A structure as defined by claim 6 having a plural part latching pin connecting the back section, the side rails, and the adult seat-back when the infant's back section of the seat is in upright position, but having means for releasing the pin from latching position, when desired.

10. In a vehicle seat, an adult seat having a notch in the mid-portion of the seat back part thereof, a main shaft spanning the notch and pivotally supported in the side walls of said notch, a combined infant's seat and bed pivotally supported on said main shaft and comprising a seat portion, a back portion, arm rests, and side rails, said seat portion having said main shaft extending therethrough and supporting it for pivotal motion in a substantially vertical direction, curved slots in the seat back portions, pins in the seat and movable in the slots and arms pivoted on said shaft and pivotally connected to the arm rests and raising them into an approximately vertical position, when the pins move in the slots beside said seat portion when that is folded up to form a part of the adult seat back portion and supporting the arm rests in a substantially horizontal position above the infant's seat portion when that is lowered into position to be used as a seat.

11. A vehicle seat comprising an adult seat portion and a back rest portion, the back rest portion having an opening extending therethrough part way down from the top to the seat portion, the sides of the back rest portion defining the opening being of rigid material and having guide slots formed therein for the guidance of the parts of an auxiliary seat, a main shaft spanning the opening in the back rest portion somewhat above the bottom of said opening, and an auxiliary seat supported on said main shaft, said auxiliary seat comprising the parts of an infant's combined seat and bed and including a seat, back rest, side rails, and arm rests, the arm rests being connected to the seat by arms pivotally mounted on the main shaft and pivotally connected to the central portion of the arm rests, one end of the arm rests being connected in sliding relation to part of the slots in the sides defining the opening in the back rest.

12. A structure as defined by claim 11 in which links connect the side rails and the back rest of the auxiliary seat whereby to cause them to function in synchronism as the back rest is lowered.

13. A structure as defined by claim 11 in which there are links connecting the side rails to the back portion of the auxiliary seat and to the seat portion thereof so that, as the seat portion and the back portion are lowered into position to form an infant's bed, the side rails will be positioned at the sides of the back portion whereby to prevent an infant from inadvertently falling off from the bed.

14. A structure as defined by claim 11 in which the seat portion of the auxiliary seat is provided with latching means to latch said seat portion to the back rest of the adult seat to hold the two relatively stationary.

15. A structure as defined by claim 11 in which the back portion of the auxiliary seat is provided with releasable latching means engageable with the back rest of the adult seat whereby to hold the back of the auxiliary seat in raised position.

16. A vehicle seat having a part for the seating of adults and an auxiliary part intermediate the ends of the adult seat for the use of an infant, the first mentioned part having a notch in the back rest portion thereof for the reception of the auxiliary part, and a shaft extending across the notch for pivotally supporting said auxiliary part, the said auxiliary part having said shaft extending therethrough and, in one position, serving as a part of the adult's seat, in another position serving as an infant's seat, and in a third position, serving as an infant's bed, the adult seat having a latching pin and an arcuate groove for the reception and guidance of said latching pin on the auxiliary part, and the guidance of said auxiliary part from a raised position to a lowered position, or from a lowered position to a raised position.

17. A vehicle seat comprising an adult portion and an auxiliary portion which may be used by either a child or an adult, the adult portion being provided in its back rest with a notch to receive the auxiliary portion, the auxiliary portion being pivotally connected to the adult portion and comprising a plurality of relatively pivoted parts, including a seat portion pivotally connected to the adult portion, a back portion pivotally connected to the adult portion, arm rests pivotally connected to the seat portion, side rails pivotally connected to the back portion, and connections between said parts whereby the seat portion may occupy a substantially vertical position or be moved to a substantially horizontal position and, in moving, will cause the arm rests to move from a position in substantial alignment with the seat portion to a position in which they serve as arm rests for a child's seat.

18. A vehicle seat comprising an adult portion and an auxiliary portion which may be used by either a child or an adult, the adult portion being provided in its back rest with a notch to receive the auxiliary portion, the auxiliary portion being pivotally connected to the adult portion and comprising a plurality of relatively pivoted parts, including a seat portion, pivotally connected to the adult portion, a back portion, pivotally connected to the adult portion, arm rests, pivotally connected to the seat portion, side rails, pivotally connected to the back portion, and connections between said parts whereby the back portion may occupy a substantially vertical position or be turned down into a substantially horizontal position and, in being turned down, causes the side rails to be raised relatively to the back portion into a protecting position, and links connecting the seat portion to the side rails whereby to control the relative positions of said parts during movements thereof.

19. A vehicle seat comprising an adult portion and an auxiliary portion which may be used by either a child or an adult, the adult portion being provided in its back rest with a notch to receive the auxiliary portion, the auxiliary portion being pivotally connected to the adult portion and comprising a plurality of relatively pivoted parts, including a seat portion, pivotally connected to the adult portion, a back portion, pivotally connected to the adult portion, arm rests, pivotally connected to the seat portion, side rails, pivotally connected to the back portion, and connections between said parts whereby the back portion may occupy a substantially vertical position or be turned down into a substantially horizontal position and, in being turned down, causes the side rails to be raised relatively to the back portion into a protecting position, and links connecting the seat portion to the side rails whereby to control the relative positions of said parts during movement thereof, the auxiliary back portion having extensible latching means located therein and projecting therefrom into engagement with the adult back portion and retractable thereinto to free same from engagement with the adult back portion, said adult back portion having a curved groove in the wall facing the auxiliary back portion, in which said latching means is receivable.

GIFFORD M. MAST.
        WRIGHT K. GANNETT.
        LEWIS M. SHUH.

REFERENCES CITED

The following references are of record in the file of this patent:

UNITED STATES PATENTS

| Number | Name | Date |
|---|---|---|
| 1,157,351 | Weber | Oct. 19, 1915 |
| 1,214,701 | Mernyk | Feb. 6, 1917 |
| 1,349,227 | Shkor | Aug. 10, 1920 |
| 1,835,947 | Johannsen | Dec. 8, 1931 |
| 2,240,748 | Bak | May 6, 1941 |
| 2,337,480 | Logan | Dec. 21, 1943 |
| 2,436,294 | Glatstein | Feb. 17, 1948 |